W. F. SCHMOELE.
GEARING.
APPLICATION FILED MAY 28, 1909.

1,323,613.

Patented Dec. 2, 1919.

Witnesses

Inventor
William Ford Schmoele

UNITED STATES PATENT OFFICE.

WILLIAM FORD SCHMOELE, OF ANTWERP, BELGIUM.

GEARING.

1,323,613.  Specification of Letters Patent.  Patented Dec. 2, 1919.

Application filed May 28, 1909. Serial No. 498,905.

*To all whom it may concern:*

Be it known that I, WILLIAM FORD SCHMOELE, a citizen of the United States, residing in Antwerp, Province of Antwerp, and Kingdom of Belgium, have invented new and useful Gearing, of which the following is a specification.

The present invention consists of planetary trains composed of cogwheels provided with pitch-line contact surfaces whereon said wheels roll, and which act also as supports and guides.

Figure 1:
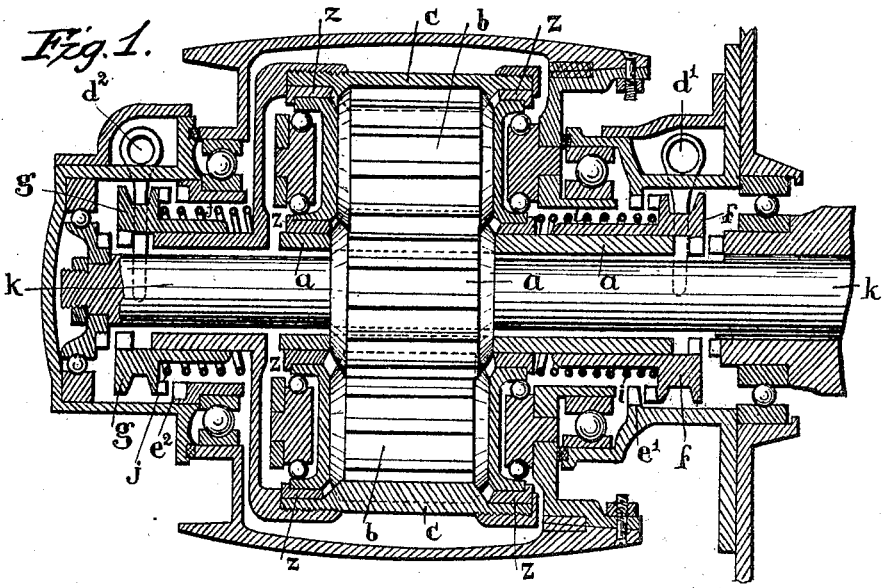
Figure 2:
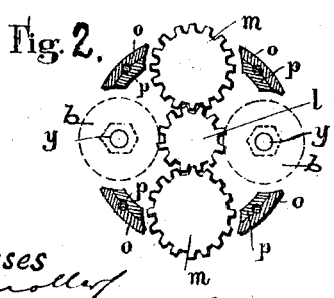

Figure 1 shows a section lengthwise through a pulley containing my invention. Fig. 2 shows a section through Fig. 1 in a plane of the pitch-line races; and Fig. 3 is a longitudinal section of the satellite cage.

Fig. 1 illustrates in section planetary trains composed of a central or sun wheel $a$, of two satellites $b$ located in a rotary cage, and of an orbit wheel $c$. The pulley is fast to the rotary cage and turns on ball bearings placed between it and the housing. Each train is traversed longitudinally through its center by a power shaft $k$ $k^2$, likewise mounted on two ball bearings, which power shaft does not have operative connection with the train, except at certain times through the intermediary of shiftable clutches $f$ and $g$.

Figure 3:
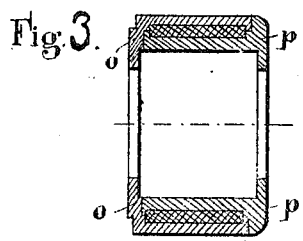

The rotary cage is composed of two pieces $o$ and $p$, seen in longitudinal section in Fig. 3 and in cross-section in Fig. 2, each piece having arms located between the satellites, said arms being turned down to overlap circularly each other, and then keyed together as shown in Fig. 3. $o$ and $p$ are held together lengthwise by bolts $y$ $y$ Fig. 2, which can be passed through the hollow centers of the false satellites $b^2$ $b^2$.

The wheels of the trains are composed of a middle toothed part, flanked by a projection on each side of the satellites $b$ and $b^2$, and by corresponding ring races on the other wheels, $a$ and $c$. These projections and ring races are turned down to correspond exactly with the pitch-line of the respective teeth. The sundry members of each planetary train support each other only through these pitch-line contact faces.

In the construction seen in Fig. 1 it is the satellites which, in their cage fast to the enveloping pulley, support the orbit wheel externally and the sun wheel internally: and neither sun wheel nor orbit wheel have any support whatever other than the projecting ends of the satellites, where they impinge and roll upon the ring races $z$ of the sun wheel and of the orbit wheel. Now, as there are four such satellites, each at 90° from one another, it is evident that the sun wheel is surrounded outwardly on all four sides by satellites, and is thus forcibly and correctly centered in the middle of the cage, but without touching this latter at all. But as two toothed satellites are amply adequate to transmit all the power, and in perfect balance, the other two satellites need not be toothed, and for this reason may be called false satellites, their only object being to help in centering. It is also evident that three satellites would suffice if placed at 120° from each other.

The same explanation applies to the orbit wheel, with the difference that the satellites, being inside of it, their supporting and centering action is exerted upon it from within.

The longitudinal guiding of both sun and orbit wheels is provided for by raised rims or flanges either on their ring races or on the projecting ends of the satellites, like those whereby railway car wheels are held on the track.

I am aware that the rolling of one cogwheel on another by lateral faces at the pitch line, as also that pitch-line rolling faces in the form of rings inserted laterally into or against planetary cogwheels have been known and used prior to my invention. The differences between their operation and that of mine will be made apparent farther on, in the description of the operation.

The construction of my invention having been thus set forth, its operation may be explained as follows:

The various speeds are obtained by clutching various free members at times to the power shaft, at times to the housing, by means of sleeves $f$ or $g$. The sleeve of a member and its spring should be entirely self-contained on the member, free from all contact with any other body and should clutch automatically with the power shaft except when grasped by its fork $d'$ or $d^2$, and thus be held to the housing.

In the example chosen for the drawings the power is supposed to enter at $k$, to pass either by gear $a$ (slow speed) or by gear $c$ (middle speed) or by both $a$ and $c$ (full speed) to the satellites $b$, through them to their cage $op$, and thence to the pulley. thence to the second pulley, and through it in the reverse direction, and out by the central power shaft. Herein is nothing new; the novel features are as follows:

The pulley, provided with fixed ball bearings, supports the satellite cage whose satellites constitute rolling supports to the other parts, called floating members, which are sometimes in motion, sometimes at a standstill. These floating members are so mounted on the supporting member that they are upheld and centered wholly and only by the rolling contact faces of the wheels. Their shanks, springs and sleeves ($if$ and $jg$ Fig. 1) do not in any way act as supports, being suspended free in space and have as sole function to clutch with the shafts $k$ or $k^2$ and revolve with it when the member is to revolve; or to clutch with the immovable housing and stand with it when the member is to stand still. The shaft $k$ or $k^2$ does not afford any support to the train. This latter, therefore, not resting on anything else than the rolling pitch-line faces, works with almost no loss by friction.

In my trains there are no idlers, that is, no parts kept at any time in motion without service or object. Idlers cause friction and consume power uselessly. At full speed the train forms a solidary mass without any internal friction whatever; and in the fractional speeds each organ works to perform a special duty; either as ingress to the power, or as a fulcrum for leverage to change the speed by clutching with the housing so as to become immovable, or as egress organ to deliver the power. Hence, no idlers at any moment, and no loss at all thus.

Again, by coupling or arranging a number of trains in tandem, instead of in parallel, the number of speeds obtainable is much in excess of the number of trains. In parallel trains, whose action results from arresting a member, for instance an orbit wheel, only one fractional speed per train is had, and it takes nine such parallel trains to produce nine speeds, as two cannot act at the same time without interfering with each other. Whereas I obtain nine speeds out of only two trains, each capable of producing only three speeds. This means that there are no idlers at all in my case, whereas there are eight in the other, and with all the loss of power consequent upon maintaining eight useless motions; as also the losses by lateral frictions between them when they touch each other sidewise. And this lateral friction is greatly increased if any of the idler motions be a reverse motion.

In view of the foregoing I claim as novel, and as being of my invention:

Planetary gearing comprising a support, a housing supported thereby, a satellite cage rotatably supported in said housing, satellite gears carried by said cage having pitch-line rolling surfaces at the ends of their teeth, a sun and an orbit gear having pitch-line rolling surfaces in engagement with the rolling surfaces of said satellite gears and supported thereby, said sun and orbit gears having each an axially extending shank, spring-pressed clutch sleeves splined on said shanks, a free shaft traversing said shanks, said shaft and support having clutch faces adapted to be engaged by said clutch sleeves, and levers to actuate the clutch sleeves; substantially as described.

WILLIAM FORD SCHMOELE.